(12) United States Patent

Chavez et al.

(10) Patent No.: US 9,049,293 B2
(45) Date of Patent: *Jun. 2, 2015

(54) PERFORMING PROXIMITY BASED ROUTING OF A PHONE CALL

(75) Inventors: Timothy R. Chavez, Austin, TX (US); Jacob D. Eisinger, Austin, TX (US); Michael C. Hollinger, Austin, TX (US); Jennifer E. King, Austin, TX (US); Christina K. Lauridsen, Austin, TX (US); Fabian F. Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1595 days.

This patent is subject to a terminal disclaimer.

(21) Appl. No.: 12/115,649

(22) Filed: May 6, 2008

(65) Prior Publication Data

US 2009/0280785 A1    Nov. 12, 2009

(51) Int. Cl.
*H04M 3/42* (2006.01)
*H04M 3/46* (2006.01)
*H04M 3/53* (2006.01)
*H04M 3/54* (2006.01)

(52) U.S. Cl.
CPC ............ *H04M 3/42348* (2013.01); *H04M 3/46* (2013.01); *H04M 3/53* (2013.01); *H04M 3/54* (2013.01); *H04M 2203/651* (2013.01); *H04M 2207/18* (2013.01); *H04M 2242/30* (2013.01)

(58) Field of Classification Search
USPC .............. 455/461, 41.2, 552.1, 426.1, 445; 379/202.1; 370/352
See application file for complete search history.

(56) References Cited

U.S. PATENT DOCUMENTS

| 5,592,533 A | 1/1997 | McHenry et al. |
| 5,845,207 A | 12/1998 | Amin et al. |
| 6,363,248 B1 | 3/2002 | Silverman |

(Continued)

FOREIGN PATENT DOCUMENTS

EP    1777916 A1    4/2007

OTHER PUBLICATIONS

U.S. Appl. No. 12/115,659, "Method and System for Performing Caller Based Routing of a Phone Call," Non-Final Office Action dated Aug. 9, 2011.

(Continued)

*Primary Examiner* — Christopher M Brandt
*Assistant Examiner* — Joseph Dean, Jr.
(74) *Attorney, Agent, or Firm* — John Pivnichny; Yudell Isidore PLCC; Noah A. Sharkan

(57) ABSTRACT

A method, system, and computer program for routing an incoming voice call in real time is presented. A call is received from a caller to an intended receiving wireless telecommunication device. In response to the call failing to connect to the intended receiving wireless telecommunication device, a short range wireless query signal is transmitted to determine if an other wireless communication device is within a predefined proximity to the intended receiving wireless telecommunication device. If the intended receiving wireless telecommunication device receives a response from the other wireless telecommunication device indicating that the other wireless telecommunication device is within the predefined proximity to the intended receiving wireless telecommunication device, then the call is rerouted to the other wireless telecommunication device.

20 Claims, 3 Drawing Sheets

(56) References Cited

U.S. PATENT DOCUMENTS

| | | | |
|---|---|---|---|
| 6,404,860 B1* | 6/2002 | Casellini | 379/88.17 |
| 6,408,187 B1 | 6/2002 | Merriam | |
| 6,421,437 B1 | 7/2002 | Slutsman | |
| 6,438,393 B1 | 8/2002 | Suuronen | |
| 6,741,688 B1 | 5/2004 | Yau | |
| 7,089,041 B2 | 8/2006 | Huang | |
| 7,130,664 B1 | 10/2006 | Williams | |
| 7,225,241 B2 | 5/2007 | Yada | |
| 7,260,205 B1* | 8/2007 | Murphy et al. | 379/215.01 |
| 7,319,744 B1 | 1/2008 | Arnold | |
| 7,356,307 B1 | 4/2008 | Parker | |
| 7,953,398 B2 | 5/2011 | Shim et al. | |
| 8,244,282 B2 | 8/2012 | Chavez et al. | |
| 8,280,412 B2 | 10/2012 | Rudolf | |
| 8,285,839 B2 | 10/2012 | Butterfield et al. | |
| 8,345,837 B2 | 1/2013 | Chavez et al. | |
| 8,385,531 B2 | 2/2013 | Chavez et al. | |
| 8,484,344 B2 | 7/2013 | Butterfield et al. | |
| 2002/0073106 A1 | 6/2002 | Parker et al. | |
| 2002/0126679 A1 | 9/2002 | Morton | |
| 2002/0186828 A1 | 12/2002 | Bushnell | |
| 2002/0194331 A1 | 12/2002 | Lewis et al. | |
| 2003/0033394 A1 | 2/2003 | Stine | |
| 2003/0059016 A1 | 3/2003 | Lieberman | |
| 2003/0120805 A1 | 6/2003 | Couts et al. | |
| 2003/0138085 A1 | 7/2003 | Forman | |
| 2004/0022237 A1 | 2/2004 | Elliott | |
| 2004/0202300 A1* | 10/2004 | Cooper et al. | 379/201.01 |
| 2005/0286705 A1 | 12/2005 | Contolini et al. | |
| 2006/0009155 A1 | 1/2006 | Paalasmaa et al. | |
| 2006/0015489 A1 | 1/2006 | Probst et al. | |
| 2006/0047810 A1 | 3/2006 | Herzog et al. | |
| 2006/0077956 A1 | 4/2006 | Saksena et al. | |
| 2006/0077957 A1 | 4/2006 | Reddy | |
| 2006/0093118 A1 | 5/2006 | Agrawal et al. | |
| 2006/0135138 A1 | 6/2006 | Lazaridis | |
| 2006/0159067 A1 | 7/2006 | Chen et al. | |
| 2006/0165060 A1 | 7/2006 | Dua | |
| 2006/0202819 A1 | 9/2006 | Adamczyk et al. | |
| 2006/0227957 A1 | 10/2006 | Dolan et al. | |
| 2006/0293061 A1* | 12/2006 | Kobayashi et al. | 455/455 |
| 2007/0032225 A1 | 2/2007 | Konicek et al. | |
| 2007/0037605 A1 | 2/2007 | Logan | |
| 2007/0044154 A1 | 2/2007 | Tsujimoto | |
| 2007/0232277 A1* | 10/2007 | Spalink | 455/414.1 |
| 2007/0287438 A1* | 12/2007 | Hansen et al. | 455/417 |
| 2008/0004009 A1 | 1/2008 | Caldwell et al. | |
| 2008/0085682 A1* | 4/2008 | Rao | 455/74 |
| 2008/0112554 A1 | 5/2008 | Arnold | |
| 2008/0130554 A1 | 6/2008 | Gisby | |
| 2008/0165948 A1 | 7/2008 | Ryals et al. | |
| 2009/0023427 A1 | 1/2009 | Kahn | |
| 2009/0086947 A1 | 4/2009 | Vendrow | |
| 2009/0279677 A1 | 11/2009 | Chavez | |
| 2009/0279680 A1 | 11/2009 | Chavez | |
| 2009/0280718 A1 | 11/2009 | Willett et al. | |
| 2009/0280785 A1 | 11/2009 | Chavez et al. | |
| 2009/0280787 A1 | 11/2009 | Chavez | |
| 2009/0280817 A1 | 11/2009 | Chavez | |
| 2009/0280818 A1 | 11/2009 | Chavez | |
| 2010/0009665 A1 | 1/2010 | Hawkins | |
| 2010/0022230 A1* | 1/2010 | Shim et al. | 455/417 |
| 2011/0021150 A1 | 1/2011 | Lin | |
| 2013/0012175 A1 | 1/2013 | Butterfield et al. | |

OTHER PUBLICATIONS

U.S. Appl. No. 12/115,663, "Method and System for Performing Routing of a Phone Call Through a Third Party Device," Non-Final Office Action dated Aug. 4, 2011.

U.S. Appl. No. 12/115,654, "Method and System for Performing Recipient Based Routing of a Phone Call," Non-Final Office Action dated Jun. 28, 2011.

U.S. Appl. No. 12/115,654 entitled "Performing Recipient Based Routing of a Phone Call"; Final office action dated Jan. 12, 2012.

U.S. Appl. No. 12/115,654 entitled "Performing Recipient Based Routing of a Phone Call"; Notice of Allowance dated Apr. 6, 2012.

U.S. Appl. No. 12/115,663 entitled "Method and System for Performing Routing of a Phone Call Through a Third Party Device"; Final office action dated Mar. 2, 2012.

U.S. Appl. No. 12/115,663 entitled "Method and System for Performing Routing of a Phone Call Through a Third Party Device"; Non-final office action dated Jul. 6, 2012.

U.S. Appl. No. 12/115,673 entitled "Method and System for Performing Routing of a Phone Call Based on Mutual Contacts of a Contact List"; Non-final office action dated Oct. 24, 2011.

U.S. Appl. No. 12/115,673 entitled "Method and System for Performing Routing of a Phone Call Based on Mutual Contacts of a Contact List"; Final office action dated Mar. 26, 2012.

U.S. Appl. No. 12/115,684 entitled "Method and System to Prevent Unintended Users From Accessing a Re-Routed Communication"; Non-final office action dated Mar. 29, 2012.

U.S. Appl. No. 12/115,659 entitled "Performing Caller Based Routing of a Phone Call"; Notice of Allowance dated May 21, 2012.

U.S. Appl. No. 12/115,684 entitled "Method and System to Prevent Unintended Users From Accessing a Re-Routed Communication"; Notice of Allowance dated Aug. 20, 2012.

U.S. Appl. No. 12/115,673 entitled "Method and System for Performing Routing of a Phone Call Based on Mutual Contacts of a Contact List"; Notice of Allowance dated Oct. 19, 2012.

U.S. Appl. No. 12/115,663 entitled "Performing Routing of a Phone Call Through a Third Party Device"; Notice of Allowance dated Jun. 24, 2013 (10 pg).

U.S. Appl. No. 12/115,659 entitled "Performing Caller Based Routing of a Phone Call"; Final office action dated Mar. 2, 2012 (21 pg).

U.S. Appl. No. 13/617,631 entitled "Communicating Messages to Proximate Devices Oncontact List Responsive to an Unsuccessful Call"; Notice of Allowance dated Mar. 4, 2013 (12 pg).

U.S. Appl. No. 13/617,631 entitled "Communicating Messages to Proximate Devices on a Contact List Responsive to an Unsuccessful Call"; Non-final office action dated Jan. 2, 2013 (17 pg).

U.S. Appl. No. 12/115,663 entitled "Performing Routing of a Phone Call Through a Third Party Device"; Final office action dated Jan. 15, 2013 (20 pg).

U.S. Appl. No. 13/559,056 entitled "Performing Caller Based Routing of a Phone Call"; Non-final office action dated Jan. 16, 2013.

U.S. Appl. No. 13/559,056 entitled "Performing Caller Based Routing of a Phone Call"; Notice of Allowance dated Aug. 30, 2013.

U.S. Appl. No. 12/395,910 entitled "Urgent Communications That Overcome Receiving Device Impediments"; Non-final office action dated Jul. 26, 2011.

U.S. Appl. No. 12/395,910 entitled "Urgent Communications That Overcome Receiving Device Impediments"; Notice of Allowance dated Jun. 1, 2012.

* cited by examiner

PERFORMING PROXIMITY BASED ROUTING OF A PHONE CALL

BACKGROUND OF THE INVENTION

1. Technical Field

The present invention relates in general to telecommunications, and in particular to cellular phones. Still more particularly, the present invention relates to performing proximity based routing of a cellular phone call.

2. Description of the Related Art

Cellular (cell) phones have become a ubiquitous aid in allowing a person to be constantly accessible. However, there are times when a person may not desire, or may be unable, to take an incoming call.

SUMMARY OF THE INVENTION

A method, system, and computer program for routing an incoming voice call in real time is presented. A call is received from a caller to an intended receiving wireless telecommunication device. In response to the call failing to connect to the intended receiving wireless telecommunication device, a short range wireless query signal is transmitted to determine if another wireless communication device is within a predefined proximity to the intended receiving wireless telecommunication device. If the intended receiving wireless telecommunication device receives a response from the other wireless telecommunication device indicating that the other wireless telecommunication device is within the predefined proximity to the intended receiving wireless telecommunication device, then the call is rerouted to the other wireless telecommunication device.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
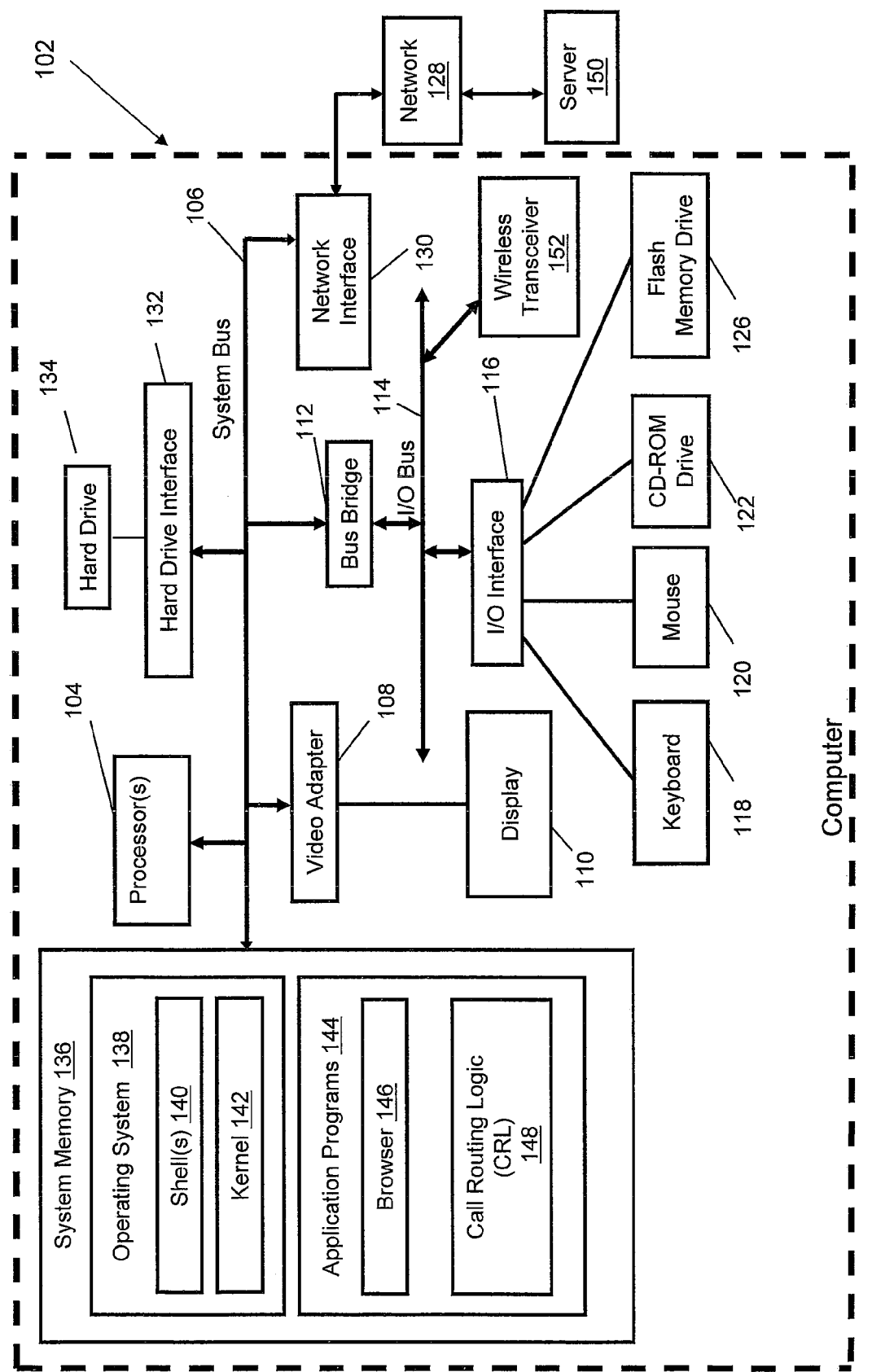
FIG. 1 is a block diagram of a data processing system in which the present invention may be implemented.

With reference now to FIG. 1, there is depicted a block diagram of an exemplary computer 102 in which the present invention may be implemented. Computer 102 includes one or more processors 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (e.g., computer 102) to send and receive network messages to the Internet using Hyper-Text Transfer Protocol (HTTP) messaging, thus enabling communication with software deploying server 150.

Application programs 144 in computer 102's system memory (as well as software deploying server 150's system memory) also include a Call Routing Logic (CRL) 148. CRL 148 includes code for implementing the processes described in FIGS. 2-3. In one embodiment, computer 102 is able to download CRL 148 from software deploying server 150, including in an "on demand" basis, as described in greater detail below in FIGS. 2-3.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 150 performs all of the functions associated with the present invention (including execution of CRL 148), thus freeing computer 102 from having to use its own internal computing resources to execute CRL 148.

Note also the architecture shown in FIG. 1 for computer 102 may be substantially implemented in Caller Telecommunication Device (CTD) 202, Host Carrier 204, Intended Recipient Wireless Telecommunication Device (IRWTD) 206, Proximate Telecommunication Devices (PTDs) 208*a-n*, and computer 210 shown below in FIG. 2. That is, although CTD 202, IRWTD 206 and PTDs 208*a-n* are described as cellular phones, by including a wireless transceiver 152 in the architecture of computer 102, the appropriate elements illustrated as components of computer 102 can operate as a "smart" phone that communicates with a host carrier (e.g., host carrier 204 shown below in FIG. 2).

Figure 2:
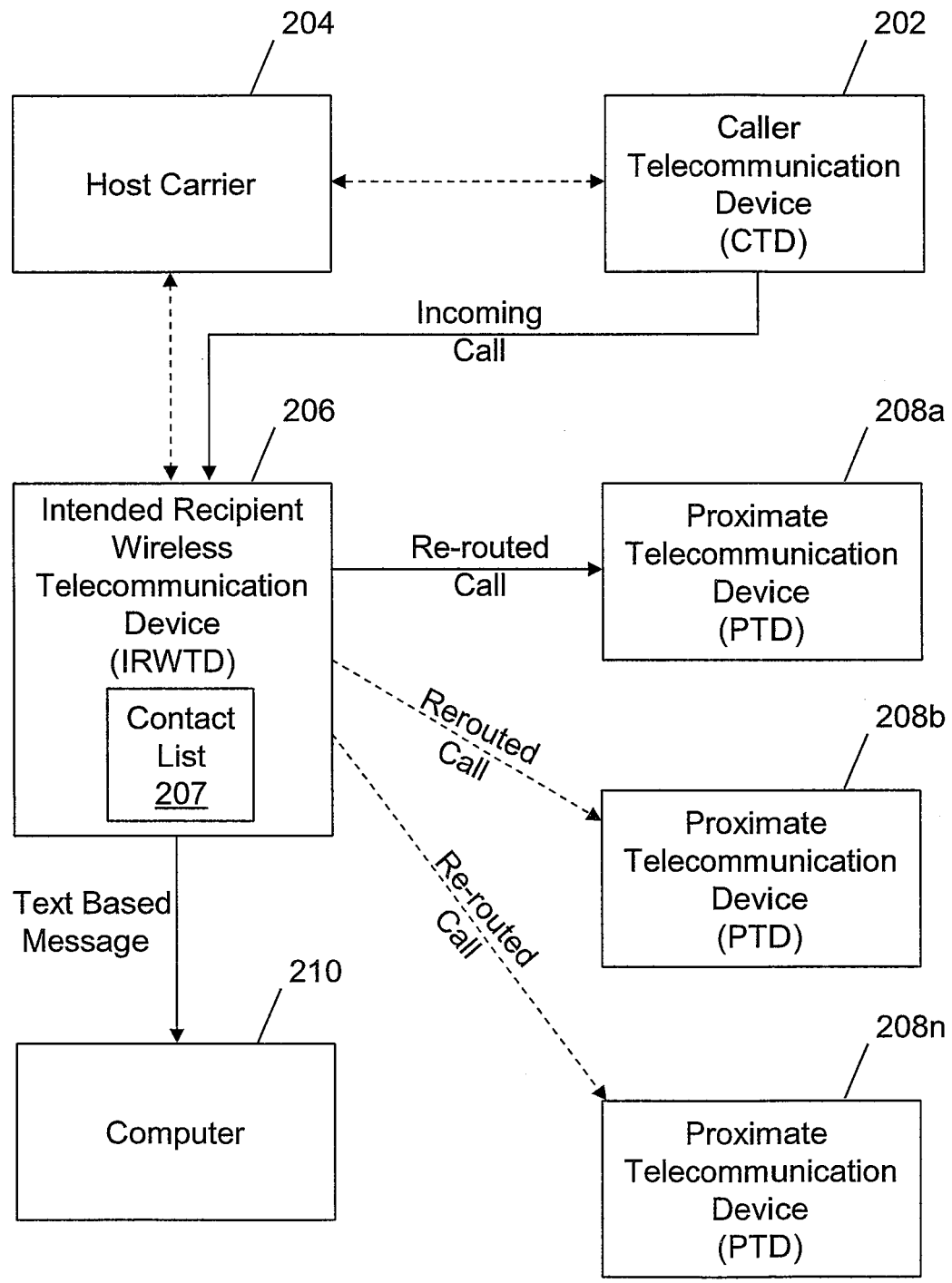
FIG. 2. is a block diagram of an exemplary system for routing a phone call.

With reference now to FIG. 2, a block diagram of the routing system used in an exemplary embodiment of the present invention is presented. A Caller Telecommunication Device (CTD) 202 (e.g., a cell phone, a Plain Old Telephone System (POTS) land line, a cell-capable Personal Assistant Device (PDA), etc.) connected to Host Carrier 204 initiates a voice call to an Intended Recipient Wireless Telecommunication Device (IRWTD) 206. Host Carrier 204 is a remote service host such as a cellular service provider that is remotely connected to both CTD 202 and IRWTD 206. If IRWTD's 206 ringer is "on", and thus the called user is available, the voice call will be connected. As described below, however, in the present invention, several options are available for routing the voice call if IRWTD's 206 ringer is "off" or if the user of the IRWTD 206 is otherwise unavailable.

When the user of IRWTD 206 is unavailable or IRWTD's 206 ringer is "off," a first routing option is for the caller who is using CTD 202 to leave a voicemail message, which will be retrievable when IRWTD 206 is either turned back on or the user becomes available. Using preferences established on software (e.g., CRL 148 depicted in FIG. 1) of CTD 202 and/or IRWTD 206, when IRWTD 206 is unavailable to receive an incoming call from CTD 202, additional options are available to reroute the voice call to a selected one of the Proximate Telecommunication Devices (PTDs) 208*a-n* (where "n" is an integer), or to send a text notification to a Computer 210.

When it is desired (according to predetermined preferences set by the user of IRWTD 206) that rerouting of an incoming voice call is preferred to a text notification, CTD 202 routes the incoming voice call to a phone selected from PTDs 208*a-n* according to a contact list 207 located within IRWTD 206. This is accomplished using software internal to IRWTD 206 (e.g., CRL 148) that autonomously utilizes a hardware based wireless technology internal to IRWTD 206, such as a short-range radio or infrared signal, to determine if any PTDs 208*a-n* within a contact list 207 (stored within IRWTD 206) are within a physically proximate short range of IRWTD 206, and are available to receive the incoming voice call. Optionally an unlicensed secure wireless personal area network (PAN), may be implemented for wireless transmission. The short range of the device is the maximum range of communication available between IRWTD 207 and one or more of the PTDs 208*a-n* without the use of a network carrier service (e.g., a cell phone carrier service), and is further determined by the internal wireless technology common to IRWTD 206 and PTD 208. If one of the PTDs 208*a-n* is in close proximity to IRWTD 206, and is available to receive a call, the voice call is routed directly to one of the PTDs 208*a-n* in proximate range. If more than one of the PTDs 208*a-n* is in range, software internal to IRWTD 206 (e.g., CRL 148) allows a user to select the desired recipient (from PTDs 208*a-n*) of the voice call, or to automatically route the voice call based on information preferences internal to IRWTD 206 and the target PTDs 208*a-n*, in addition to usage information, such as battery strength or signal strength. That is, self-monitoring processes controlled by CRL 148 within IRWTD 206 and/or PTDs 208*a-n* determine which of the PTDs 208*a-n* is a best candidate for receiving the re-routed phone call, based on which user is associated with a particular PTD 208, what the current battery strength of a particular PTD 208 is in present time, etc.

If the re-routing of the voice call from IRWTD 206 to one of the PTDs 208*a-n* should fail, software (e.g., CRL 148) internal to CTD 202 and IRWTD 206 determines if another routing attempt should be made. Preferences in CTD 202 and IRWTD 206 software can be utilized to limit call routing attempts to a specific number. For example, if routing of the call from the IRWTD 206 to one of the PTDs 208*a-n* fails after trying to re-route the call to three different PTDs from PTDs 208*a-n*, then a voicemail may be left for IRWTD 206 (i.e., a voicemail may be stored with the host carrier 204).

Software (e.g., CRL 148) internal to CTD 202, IRWTD 206, PTDs 208*a-n* allows a user to establish additional preferences related to the call routing. These preferences can be stored on CTD 202, IRWTD 206, PTDs 208, and/or on Host Carrier 204. Some examples of such preferences include routing lists as well as preferences regarding battery strength or signal strength. Routing lists may be organized based on the priority of the contacts as determined by the end user. Routing lists may contain contacts that calls should always or never be routed to, or lists that enable the device to automatically accept or decline incoming routing attempts from specific contacts or groups of contacts known or unknown to the device. For example, a routing preference (which in one embodiment is set by the user of IRWTD 206) may state that if a call comes from "Caller A" (as identified by a caller identification associated with the incoming call), then that call should be sent to PTD 208*a* or 208*b*, but never to PTD 208*n*. Preferences within CTD 202, IRWTD 206, PTDs 208*a-n* also allow a user to automatically re-route calls when battery life in IRWTD 206 and/or an initial one of the PTDs 208*a-n* is low, or when a weak signal is detected. For example, one of the preferences may state that if IRWTD 206 detects that PTD 208*a* has a low battery and/or a weak signal, then other PTDs 208*b-n* are polled until one of sufficient battery and signal strength (as well as authorization) is located. The call will then be automatically re-routed to the PTD 208 that meets the requisite conditions (e.g., strong battery, strong signal strength with the IRWTD 206, authorized to take the call from "Caller A," etc.)

Additionally, software (e.g., CRL 148) internal to PTDs 208*a-n* may enable the PTDs 208*a-n* to differentiate a re-routed voice call from a normal voice call by utilizing unique aural, visual, or tactile signals to the user. PTDs 208*a-n* may audibly signal the user of an incoming re-routed voice call by using methods such as playing a unique sound effect or a specific ring tone. PTDs 208*a-n* may visually signal the user of an incoming re-routed voice call by using methods such as flashing a specific service light color or pattern of colors, or by displaying caller identifying information of CTD 202 and IRWTD 206 on the screen. PTD 208*a-n* may also use a vibration function or a specific vibration pulse pattern to signal the user of an incoming re-routed voice call. Thus, these unique aural and/or visual cues alert a user of one of the PTDs 208*a-n* that the incoming call was intended for the user of IRWTD 206, but has been re-routed to the user of that PTD 208. Therefore, when the user of that PTD 208 answers the call, he will be forewarned that the caller is likely to be expecting the user of IRWTD 206 to have answered the call.

When user input or preferences internal to CTD 202 or IRWTD 206 specify that call routing is not desired, a text notification message with critical information concerning the incoming call can be transmitted to computer 210. This text based message may or may not be used in conjunction with a voice mail message that is left and stored on the host carrier 204 as described above. The text notification message contains information such as a phone number and contact information for CTD 202 and IRWTD 206, as well as date and time stamp information of the voice call. Additionally, utilizing voice-to-text software common to CTD 202, IRWTD 206, and/or computer 210, the user may choose to leave a text notification message containing a voice-to-text translation of a voice message left by the user (and stored with host carrier 204). Computer 210 is a telecommunication device, a personal computer, or a combination of any number of telecommunication devices or personal computers. The text notification message can be presented in such means as an e-mail, an instant message, a short message service (SMS) message, or as posted text on an internet portal.

Figure 3:
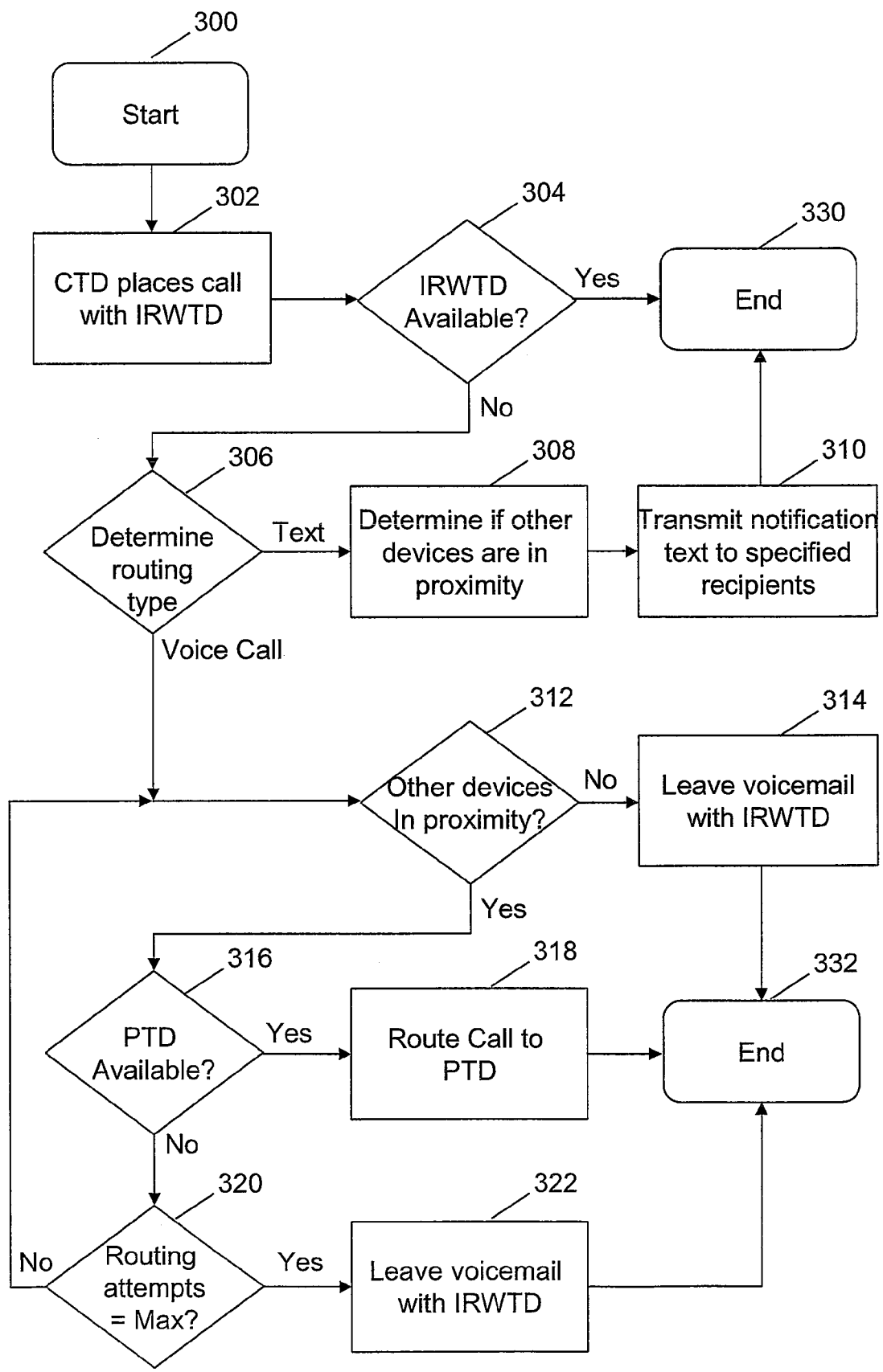
FIG. 3. is a high-level logical flowchart of an exemplary set of steps performed to re-route a phone call.

With reference now to FIG. 3, a high-level logical flowchart of an exemplary set of steps performed to route a phone call is presented. After initiator block 300, a voice call is initiated from a Caller Telecommunication Device (CTD) to an Intended Recipient Wireless Telecommunication Device (IRWTD) (block 302). It is then determined by the Host Carrier if the IRWTD is available (block 304). If IRWTD is available, the call is picked up and the process ends at terminator block 330. When IRWTD is not available, a user input or software common to the CTD and the IRWTD identifies a user's preference for the type of routing desired, if a text notification message is to be generated, assuming that rerouting and/or processing of the voice call is desired and appropriate (block 306).

As shown at query block 306, if a text notification message for the incoming call is desired, based on user input and preferences internal to the CTD and the IRWTD, the IRWTD determines if any preferred Proximate Telecommunication Devices (PTDs) are within am predefined proximity of the IRWTD (block 308). The term "predefined proximity" is defined as the distance between the IRWTD and a PTD in which local wireless communication is possible without the use of an intervening network or carrier. That is, the term "predefined proximity" is defined as a distance within which the IRWTD and PTD can directly communicate using local electromagnetic signals (including radio, infrared, secure PAN, etc.) to directly communicate between one another.

A text notification message contains a date stamp, a time stamp, caller information, intended recipient contact information, and/or a voice-to-text message. This text notification message is sent to any preferred PTDs in proximate range of IRWTD and/or one or more remote computers as determined by software internal to IRWTD (block 310). The process terminates at block 330.

Returning to query block 306, if voice call rerouting is desired (instead of or in addition to creating the text message describe above), based on user input and preferences internal to the CTD and the IRWTD, the IRWTD determines if any preferred Proximate Telecommunication Devices (PTDs) are within the predefined proximity (as defined above) to the IRWTD (query block 312). If no preferred PTD(s) are within the predefined proximity to IRWTD, a voicemail is left with the host carrier for the IRWTD (block 314). The process terminates at block 332.

Returning to query block 312, if a preferred PTD(s) is within physical proximity to the IRWTD, the IRWTD next determines if a first PTD is available (block 316). PTD priority is determined by preferences internal to the CTD, the IRWTD, and the PTD, and can also be determined by factors such as signal strength and battery strength within one or more of these devices. If the first PTD is available the voice call is routed to that first PTD (block 318), and the process terminates at block 332. However, if the first preferred PTD is unavailable, then software internal to the IRWTD and the CTD determines if the maximum call routing attempts have been made (block 320). If another call route attempt is desired based upon user input, and the number of routing attempts performed is still less than the maximum allowed, then the process loops back to query block 312 in an iterative manner to determine if there are other PTD devices in proximity to the IRWTD (block 312). If another call route attempt is not to be performed (i.e., the number of authorized attempts has been reached), then a voicemail is left with the IRWTD (block 322), and the process terminates at block 332.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of data storage media, which include, without limitation, non-writable storage media (e.g. CD-ROM), and writable storage media (e.g. network attached storages, hard disk drive, read/write CD-ROM, optical media). It should be understood, therefore, that such data storage media, when storing computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to preferred embodiments thereof, it will be apparent that modifications and variations are possible without departing from the scope of the invention defined in the appended claims.

What is claimed is:

1. A method of routing an incoming phone call, the method comprising:
    in response to an intended receiving telecommunication device receiving a call from a caller telecommunication device, determining, by a processor whether a ringer of the intended receiving telecommunication device is off;
    in response to determining that the ringer of the intended receiving telecommunication device is off, triggering, by the processor, the intended receiving telecommunication device to transmit a short range wireless signal to determine whether wireless telecommunication devices are within range and active; and
    in response to the intended receiving telecommunication device receiving responses from two or more of the wireless telecommunication devices indicating that the two or more of the wireless telecommunication devices have received the short range wireless signal, rerouting, by the processor, the call to one of the two or more of the wireless telecommunication devices based, in part, on preferences stored internal to the intended receiving telecommunication device specifying which of the wireless telecommunication devices has highest priority for receiving the call in case the intended receiving telecommunication device is unavailable and signal strengths and battery strengths of the two or more of the wireless telecommunication devices.

2. The method of claim 1, further comprising:
determining whether a text message related to the call is to be generated; and
in response to determining that the text message related to the call is to be generated, generating and transmitting the text message.

3. The method of claim 2, wherein the text message is a pre-scripted notification message.

4. The method of claim 3, wherein the pre-scripted notification message includes information describing a caller identification of the caller, a time that the call was received, and a phone number of the intended receiving telecommunication device.

5. The method of claim 3, wherein the pre-scripted notification message includes a voice-to-text transcription of a voicemail message left by the caller on the intended receiving telecommunication device.

6. The method of claim 3, wherein the pre-scripted notification message controls a visual indicator on the wireless telecommunication devices, wherein the visual indicator indicates that the call has been rerouted from the intended receiving telecommunication device to one of the wireless telecommunication devices.

7. The method of claim 3, wherein the pre-scripted notification message controls an audible indicator on the wireless telecommunication devices, wherein the audible indicator indicates that the call has been rerouted from the intended receiving telecommunication device to one of the wireless telecommunication devices.

8. A system comprising:
a memory; and
a processor coupled to the memory, wherein the processor is configured to:
in response to an intended receiving telecommunication device receiving a call from a caller telecommunication device, determine whether a ringer of the intended receiving telecommunication device is off;
in response determining that the ringer of the intended receiving telecommunication device is off, trigger the intended receiving telecommunication device to transmit a short range wireless signal to determine whether wireless telecommunication devices are within range and active; and
in response to the intended receiving telecommunication device receiving responses from two or more of the wireless telecommunication devices indicating that the two or more of the wireless telecommunication devices have received the short range wireless signal, reroute the call to one of the two or more of the wireless telecommunication devices based, in part, on preferences stored internal to the intended receiving telecommunication device specifying which of the wireless telecommunication devices has highest priority for receiving the call in case the intended receiving telecommunication device is unavailable and signal strengths and battery strengths of the two or more of the wireless telecommunication devices.

9. The system of claim 8, wherein the processor is further configured to:
determine whether a text message related to the call is to be generated; and
in response to determining that the text message related to the call is to be generated, generate and transmit the text message.

10. The system of claim 9, wherein the text message is a pre-scripted notification message.

11. The system of claim 10, wherein the pre-scripted notification message includes information describing a caller identification of the caller, a time that the call was received, and a phone number of the intended receiving wireless telecommunication device.

12. The system of claim 10, wherein the pre-scripted notification message includes a voice-to-text transcription of a voicemail message left by the caller on the intended receiving wireless telecommunication device.

13. The system of claim 10, wherein the pre-scripted notification message controls a visual indicator on the other wireless telecommunication devices, wherein the visual indicator indicates that the call has been rerouted from the intended receiving wireless telecommunication device to one of the other wireless telecommunication devices.

14. The system of claim 10, wherein the pre-scripted notification message controls an audible indicator on the other wireless telecommunication devices, wherein the audible indicator indicates that the call has been rerouted from the intended receiving wireless telecommunication device to one of the other wireless telecommunication devices.

15. A computer program product comprising:
one or more computer-readable tangible storage devices; and
program code embodied on the storage devices, wherein the program code, when executed by a data processing system, configures the data processing system to:
in response to an intended receiving telecommunication device receiving a call from a caller telecommunication device, determine whether a ringer of the intended receiving telecommunication device is off;
in response determining that the ringer of the intended receiving telecommunication device is off, trigger the intended receiving telecommunication device to transmit a short range wireless signal to determine whether wireless telecommunication devices are within range and active; and
in response to the intended receiving telecommunication device receiving responses from two or more of the wireless telecommunication devices indicating that the two or more of the wireless telecommunication devices have received the short range wireless signal, reroute the call to one of the two or more of the wireless telecommunication devices based, in part, on preferences stored internal to the intended receiving telecommunication device specifying which of the wireless telecommunication devices has highest priority for receiving the call in case the intended receiving telecommunication device is unavailable and signal strengths and battery strengths of the two or more of the wireless telecommunication devices.

16. The computer program product of claim 15, wherein the program code, when executed by the data processing system, further configures the data processing system to:
determine whether a text message related to the call is to be generated; and
in response to determining that the text message related to the call is to be generated, generate and transmit the text message.

17. The computer program product of claim 16, wherein the text message is a pre-scripted notification message.

18. The computer program product of claim 17, wherein the pre-scripted notification message includes information describing a caller identification of the caller, a time that the call was received, and a phone number of the intended receiving telecommunication device.

19. The computer program product of claim 17, wherein the pre-scripted notification message includes a voice-to-text transcription of a voicemail message left by the caller on the intended receiving telecommunication device.

20. The computer program product of claim 17, wherein the pre-scripted notification message controls a visual indicator on the wireless telecommunication devices, wherein the visual indicator indicates that the call has been rerouted from the intended receiving telecommunication device to one of the wireless telecommunication devices.

\* \* \* \* \*